April 23, 1940. A. H. WOLFERZ ET AL 2,198,371

POWER FACTOR INDICATOR

Filed Aug. 9, 1938

Inventors:
Alfred H. Wolferz,
John H. Miller,
By Potter, Pierce & Scheffler,
Attorneys.

Patented Apr. 23, 1940

2,198,371

UNITED STATES PATENT OFFICE 2,198,371

POWER FACTOR INDICATOR

Alfred H. Wolferz, Hillside, and John H. Miller, Short Hills, N. J., assignors to Weston Electrical Instrument Corporation, Newark, N. J., a corporation of New Jersey Application August 9, 1938, Serial No. 223,962

6 Claims. (Cl. 172—245)

This invention relates to power factor indicators and particularly to apparatus for measuring the power factor and reactive factor of single phase and balanced polyphase circuits without opening the circuits.

Prior proposals for measuring power factor by subjecting an ammeter to the resultant current obtained by combining a current in phase with the line current and a current in phase with the line voltage have lacked usefulness because of various limitations among which are the importance of loose coupling between the line current and voltage circuits. It has been proposed to employ an open core current transformer to obtain the desired loose coupling and, with this equipment, the current component was adjusted in magnitude by moving the transformer towards and away from the line conductor.

An object of this invention is to provide apparatus for measuring the power factor of a circuit, the apparatus being characterized by high sensitivity and by a high accuracy that is substantially independent of movement of the current transformer with respect to the line conductor.

An object is to provide apparatus for measuring the power factor of a circuit, the apparatus including an ammeter in a bridge network upon which the current and voltage components are impressed across conjugate arms, thereby providing substantially zero coupling between the current and the voltage circuits. A further object is to provide accurate measuring apparatus of the types stated in which the current component is derived from the line conductor through a closed core instrument transformer that may be permanently or temporarily associated with the line conductor.

These and other objects and advantages of the invention will be apparent from the following specification when taken with the accompanying drawing in which.

Figure 1:
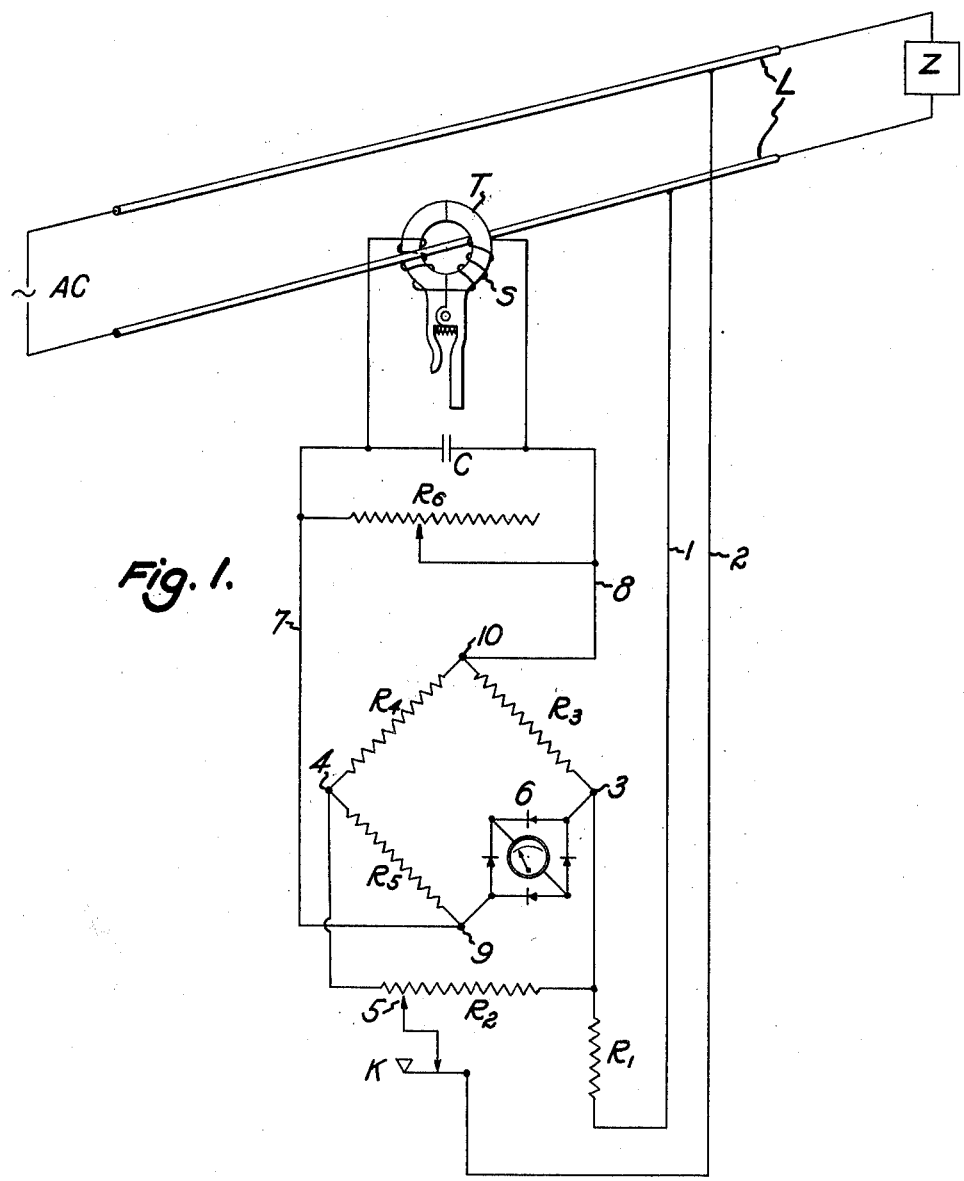
Fig. 1 is a circuit diagram of an embodiment of the invention.

In the drawing, the reference character L identifies a single phase line or bus bar system which extends from an alternating current source AC and a load Z. Leads 1, 2 are connected to the line to supply a current component in phase with the line voltage, a fixed resistor R1 being included in lead 1 to limit the maximum current that may be drawn from the voltage supply. The lead 1 is continued beyond resistor R1 to a junction 3 of a Wheatstone bridge and a resistor R2 is shunted across junction 3 and the opposite bridge junction 4. The lead 2 extends through a key switch K to an adjustable tap 5 on the resistor R2.

The bridge arms that terminate at junction 3 comprise a rectifier type of alternating current ammeter 6, i. e. a sensitive direct current instrument of the permanent magnet, moving coil type and a rectifier bridge, and a resistor R3 which is similar to the indicating instrument both as to normal resistance value and as to resistance change with temperature and current. The bridge arms that terminate at bridge junction 4 comprise fixed resistors R4, R5 which are noninductive and have values that are substantially independent of temperature changes.

The current component is obtained from one line conductor or bus through the instrument transformer T which has a closed core that encircles the line or bus. This transformer may be of the type included in the model 633 clamp-on ammeter manufactured by the Weston Electrical Instrument Corporation when the apparatus is not permanently associated with the conductor. The secondary winding S is shunted by a condenser C which corrects the phase angle error due to the transformer. The value of the condenser C depends upon the frequency but a fixed condenser appropriate for 60 cycles will afford substantially accurate measurements in the range of from 55 to 65 cycles. The capacity should be adjusted for measurement of the power factor at frequencies above or below that range. Leads 7, 8 extend from the secondary S to the bridge terminals 9, 10 that are conjugate to terminals 3, 4, and an adjustable resistance R6 is shunted across the leads 7, 8 to adjust the magnitude of the current vector.

Figure 2:
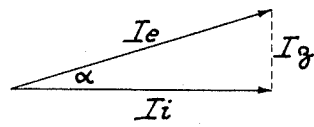
Fig. 2 is a vector diagram of the several current components that may be indicated by appropriate adjustment of the Fig. 1 circuit.

The measurement of the power factor is effected in the following manner. Since the line voltage is usually substantially constant and not subject to such changes as occur in line current, the voltage component is first adjusted to a predetermined value. This is done by setting the resistor R6 to zero to eliminate any current component from the bridge, and then adjusting the tap 5 along resistor R2 to bring the instrument pointer to a fixed value, preferably the full scale reading of the instrument 6. The resistor R6 is then adjusted to bring the instrument reading to a minimum value. By reference to Fig. 2, it will be seen that this minimum reading is equal to the reactive current component I2, and is the current which actuates the indicating instrument. The voltage vector or current value I$e$ was set at a predetermined value, which may be considered as unity, and the current component I$i$ which results in a minimum I$z$ is such that $$\frac{Iz}{Ie}$$

is the sine of the phase angle $\alpha$ between the line current and voltage, and $$\frac{Ii}{Ie}$$

is the cosine. The power factor or cosine of angle $\alpha$ is obtained by depressing the key switch K to remove the voltage component I$e$, thus leaving in the network only the current component I$i$ which is proportional to the cosine of angle $\alpha$. The instrument may be provided with a scale of graduations of values of the angle $\alpha$, and/or of the cosine of the angle $\alpha$.

The vector obtained when the apparatus is connected to a balanced polyphase circuit and adjusted for minimum reading is proportional to the sine of $(90°-\alpha)$ which is equivalent to the cosine of $\alpha$. Elimination of the voltage component by depressing the key K results in a reading proportional to sine $\alpha$ or the reactive current component.

The described apparatus may of course be employed for measuring voltage and/or current as well as the power factor. The invention is particularly useful for the occasional checking of the power factor with a clamp-on instrument transformer but may, if desired, be permanently associated with the line. The accuracy of tre readings is not dependent upon the steadiness with which a clamp-on transformer is held in place on the line, and the adjustments of the current and voltage components have no effect upon each other when the bridge network is properly balanced.

We claim:

1. Apparatus for measuring the power factor of a circuit comprising a balanced Wheatstone bridge network having a current measuring instrument as one of the four side arms thereof, adjustable circuit connections to a pair of diagonally arranged terminals of the bridge network for impressing on the instrument a current in phase with the line voltage and of a preselected magnitude, a closed core instrument transformer for association with the circuit, said transformer having a secondary winding carrying current substantially in phase with the line current, circuit elements connecting said secondary winding to the other pair of diagonally arranged terminals of the bridge network, means adjustable to impress on the instrument a current component from said secondary winding which reduces the instrument reading to a minimum value, and a switch for removing the voltage component of current from said instrument, whereby the resulting instrument reading is proportional to the cosine of the phase angle.

2. In apparatus for measuring the power factor of a circuit, a balanced bridge network including four resistive arms, one arm comprising an ammeter, means for impressing across conjugate terminals of said bridge network currents in phase respectively with the current and with the voltage of said line, said means including circuit elements adjustable to vary the relative magnitudes of said impressed currents, and a switch for removing from said bridge the current that is in phase with the line voltage.

3. The invention as claimed in claim 2, wherein said means includes an instrument transformer having a substantially closed core encircling the line and a secondary connected to said bridge network to impress thereon a current in phase with the line current.

4. In apparatus for measuring the power factor and/or reactive factor of a circuit, a bridge network having a current measuring means as one arm and three balancing arms, a cross arm for said bridge comprising leads for connection across the circuit, a switch and a voltage divider included in said leads, a current transformer for association with the circuit and having a secondary connected as the other cross arm of the bridge network, and an adjustable resistance shunted across said secondary.

5. The invention as claimed in claim 4, wherein said current measuring means comprises a direct current instrument and a rectifier bridge.

6. The invention as claimed in claim 4, wherein said current transformer has a sectional closed core.

ALFRED H. WOLFERZ.
JOHN H. MILLER.